United States Patent
Suzuki

(10) Patent No.: US 11,214,245 B2
(45) Date of Patent: Jan. 4, 2022

(54) VEHICLE CONTROL APPARATUS

(71) Applicant: SUBARU CORPORATION, Tokyo (JP)

(72) Inventor: Hiroyuki Suzuki, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 174 days.

(21) Appl. No.: 16/590,941

(22) Filed: Oct. 2, 2019

(65) Prior Publication Data

US 2020/0156628 A1 May 21, 2020

(30) Foreign Application Priority Data

Nov. 20, 2018 (JP) .............................. JP2018-217027

(51) Int. Cl.
*B60W 30/00* (2006.01)
*B60W 30/09* (2012.01)
*B60W 30/06* (2006.01)
*B60W 30/18* (2012.01)

(52) U.S. Cl.
CPC ............ *B60W 30/09* (2013.01); *B60W 30/06* (2013.01); *B60W 30/18009* (2013.01); *B60W 2400/00* (2013.01); *B60W 2554/00* (2020.02); *B60W 2720/106* (2013.01)

(58) Field of Classification Search
CPC ........... B60W 30/09; B60W 30/18009; B60W 2554/00; B60W 2400/00; B60W 2720/106
See application file for complete search history.

(56) References Cited

U.S. PATENT DOCUMENTS

| 9,371,072 | B1* | 6/2016 | Sisbot | B60W 40/072 701/41 |
| 10,007,269 | B1* | 6/2018 | Gray | G05D 1/0248 701/28 |
| 10,106,157 | B2* | 10/2018 | Sawada | B60W 30/09 701/26 |
| 2017/0045610 | A1 | 2/2017 | Mizutani | |
| 2020/0079362 | A1* | 3/2020 | Kingman | B60W 30/09 701/26 |
| 2020/0247399 | A1* | 8/2020 | Tanahashi | B60W 30/09 701/26 |
| 2021/0009117 | A1* | 1/2021 | Emura | B60W 30/09 701/26 |
| 2021/0100156 | A1* | 4/2021 | Iwase | A01B 69/00 701/50 |
| 2021/0139022 | A1* | 5/2021 | Tao | B60W 30/0956 |

FOREIGN PATENT DOCUMENTS

JP 2015-206646 A 11/2015

* cited by examiner

*Primary Examiner* — Thomas G Black
*Assistant Examiner* — Brittany Renee Peko
(74) *Attorney, Agent, or Firm* — McDermott Will & Emery LLP

(57) ABSTRACT

A vehicle control apparatus includes a traveling controller and a determination unit. The traveling controller is configured to control driving force when a vehicle travels. The determination unit is configured to determine, in a case where an obstacle is detected on a road surface on which the vehicle travels, appropriateness of the vehicle passing over the obstacle. The traveling controller is configured to control the driving force of the vehicle to prevent the vehicle from passing over the obstacle in a case where the determination unit determines that it is inappropriate to pass over the obstacle.

13 Claims, 11 Drawing Sheets

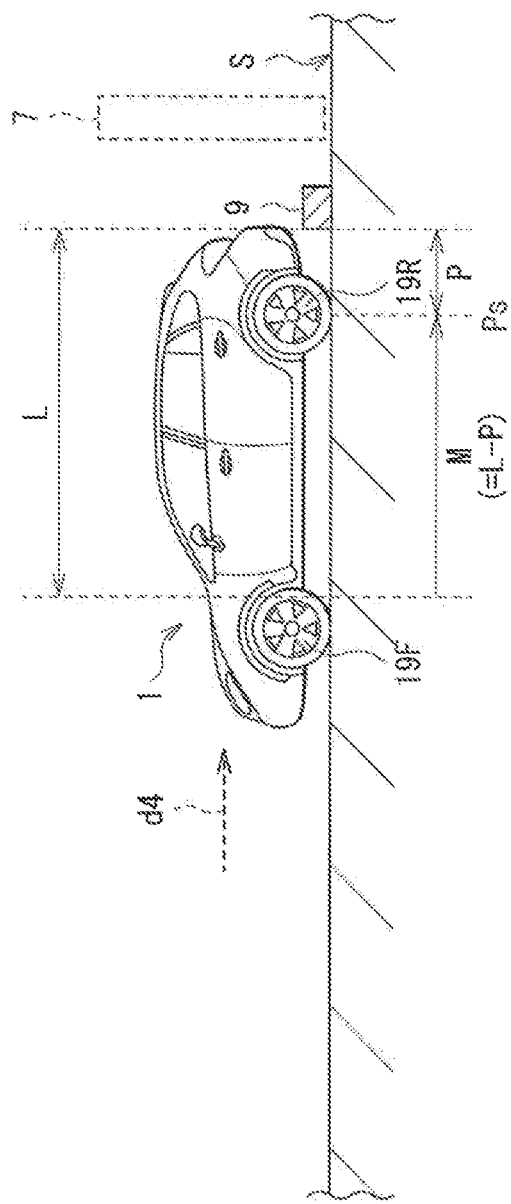

VEHICLE CONTROL APPARATUS

CROSS-REFERENCE TO RELATED APPLICATIONS

The present application claims priority from Japanese Patent Application No. 2018-217027 filed on Nov. 20, 2018, the entire contents of which are hereby incorporated by reference.

BACKGROUND

The technology relates to a vehicle control apparatus that controls an operation of a vehicle.

SUMMARY

An aspect of the technology provides a vehicle control apparatus including a traveling controller and a determination unit. The traveling controller is configured to control driving force when a vehicle travels. The determination unit is configured to determine, in a case where an obstacle is detected on a road surface on which the vehicle travels, appropriateness of the vehicle passing over the obstacle. The traveling controller is configured to control the driving force of the vehicle to prevent the vehicle from passing over the obstacle in a case where the determination unit determines that it is inappropriate to pass over the obstacle.

An aspect of the technology provides a vehicle control apparatus including circuitry configured to control driving force when a vehicle travels, determine, in a case where an obstacle is detected on a road surface on which the vehicle travels, appropriateness of the vehicle passing over the obstacle, and control the driving force of the vehicle to prevent the vehicle from passing over the obstacle in a case where the determination is made that it is inappropriate to pass over the obstacle.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

FIGS. 7A and 7B are schematic diagrams illustrating an example of automatic parking during rearward traveling according to a modification example.

DETAILED DESCRIPTION

Figure 1:
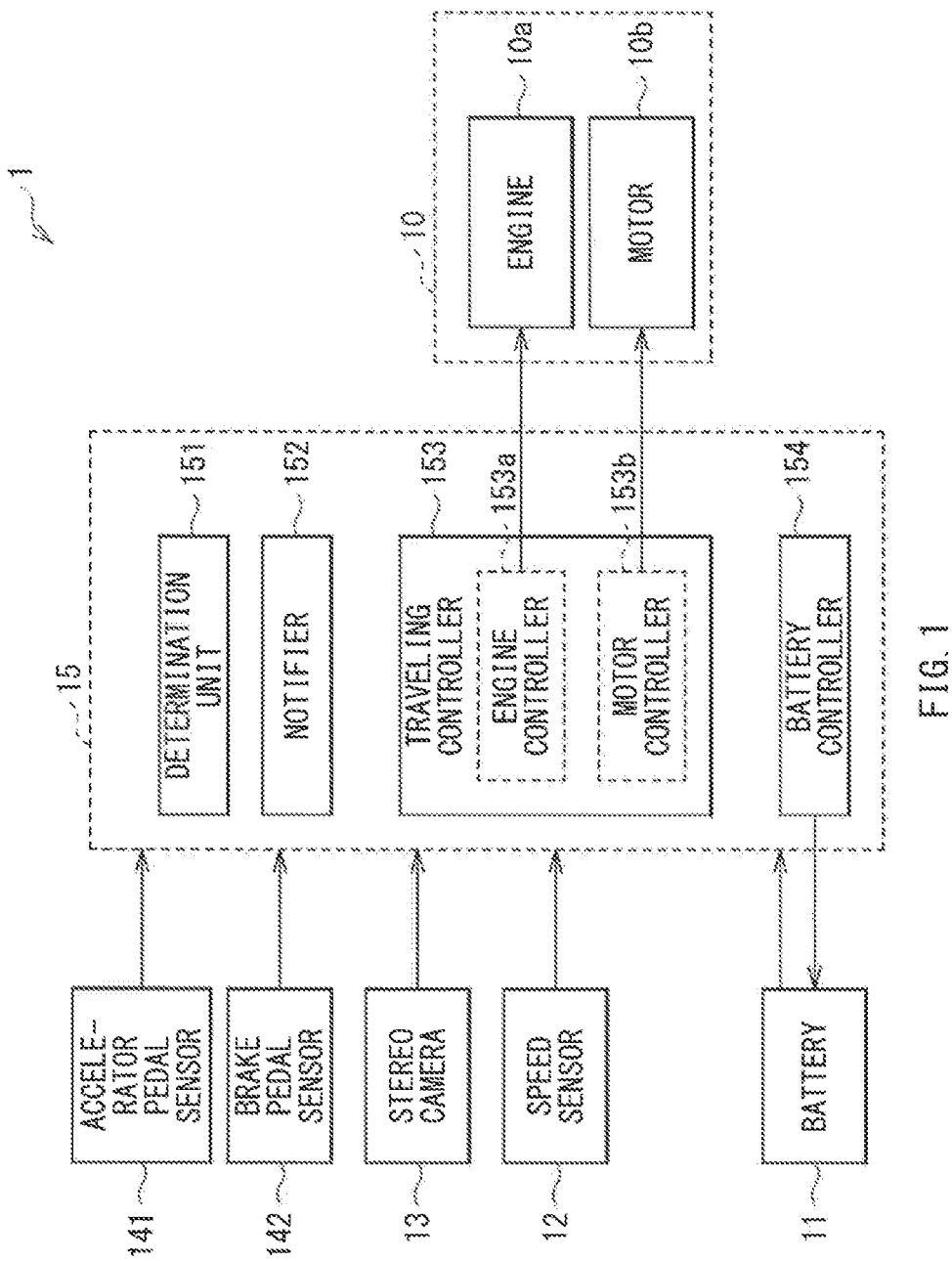
FIG. 1 is a block diagram illustrating a schematic configuration example of a vehicle including a vehicle control apparatus according to one example embodiment of the technology.

In recent years, hybrid electric vehicles (HEVs) have been widely put to practical use. The HEV makes it possible to effectively improve a rate of fuel consumption (fuel economy) of a vehicle by using an engine and an electric motor in combination. Electric vehicles (EVs) also have been put to practical use. The EV prevents emission of exhaust gas by using only an electric motor as a driving force source. For example, Japanese Unexamined Patent Application Publication No. 2015-206646 discloses various kinds of control of such vehicles.

In general, it is demanded that such vehicles be improved in stability during traveling (traveling stability).

It is desirable to provide a vehicle control apparatus that makes it possible to improve traveling stability of a vehicle.

In the following, some example embodiments of the technology are described with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same function and configuration are denoted with the same numerals to avoid any redundant description. The description is given in the following order.

1. Example Embodiment (an example of control process when automatic parking is performed during forward traveling)
2. Modification Example (an example of control process when automatic parking is performed during rearward traveling)
3. Other Modification Examples

1. EXAMPLE EMBODIMENT

[Outline of Configuration]

FIG. 1 is a block diagram illustrating a schematic configuration example of a vehicle 1 including a vehicle control apparatus (a vehicle controller 15 to be described later) according to an example embodiment of the technology.

As illustrated in FIG. 1, the vehicle 1 may mainly include a driving force source 10, a battery 11, a speed sensor 12, a stereo camera 13, an accelerator pedal sensor 141, a brake pedal sensor 142, and the vehicle controller 15.

[A. Driving Force Source 10]

The vehicle 1 may be provided with, as the driving force source 10, an engine 10a (an internal combustion engine) and a motor 10b (an electric motor), as illustrated in FIG. 1. In other words, the vehicle 1 may be configured as a hybrid electric vehicle (HEV) including the engine 10a and the motor 10b as the driving force source 10.

Accordingly, the vehicle 1 may have three types of traveling modes, i.e., hybrid traveling that uses both the engine 10a and the motor 10b as a driving force source, engine traveling that uses only the engine 10a as a driving force source, and motor traveling that uses only the motor 10*b* as a driving force source. These three types of traveling modes may be used while being switched as needed depending on, for example, traveling conditions of the vehicle 1.

[B. Battery 11]

The battery 11 may store electric power to be used in the vehicle 1. The battery 11 may include, for example, any of various secondary batteries such as a lithium ion battery. Note that the battery 11 may store, for example, regenerated electric power that is supplied from the motor 10*b*, in addition to electric power (charged electric power) that is obtained by charging from the outside of the vehicle 1.

[C. Speed Sensor 12 and Stereo Camera 13]

The speed sensor 12 may detect a speed at which the vehicle 1 travels, i.e., a vehicle speed. The vehicle speed detected by the speed sensor 12 may be outputted to the vehicle controller 15 (e.g., a traveling controller 153 to be described later), as illustrated in FIG. 1.

The stereo camera 13 may be an imaging unit that captures an image of a surrounding situation, i.e., a traveling environment, of the vehicle 1 to detect the surrounding situation. The stereo camera 13 may include two cameras, i.e., a right camera and a left camera. Information of the surrounding situation thus obtained by the stereo camera 13 may be outputted to the vehicle controller 15 (e.g., a determination unit 151 and the traveling controller 153 to be described later), as illustrated in FIG. 1. For example, the information of the surrounding situation may be a captured image or a distance, such as an inter-vehicle distance.

The vehicle 1 may be provided with a single camera or a radar unit, for example, instead of such a stereo camera 13.

[D. Accelerator Pedal Sensor 141 and Brake Pedal Sensor 142]

The accelerator pedal sensor 141 may detect an amount of accelerator pedal depression by a driver of the vehicle 1, i.e., an accelerator position. The brake pedal sensor 142 may detect an amount of brake pedal depression by the driver of the vehicle 1. The accelerator pedal and the brake pedal are not illustrated.

The amounts of depression of the accelerator pedal and the brake pedal thus detected by the accelerator pedal sensor 141 and the brake pedal sensor 142 may be outputted to the vehicle controller 15 (e.g., the traveling controller 153 to be described later) as illustrated in FIG. 1.

[E. Vehicle Controller 15]

The vehicle controller 15 may control various operations of the vehicle 1, and perform various kinds of arithmetic processing. In one example, the vehicle controller 15 may include a microprocessor, a read only memory (ROM), a random access memory (RAM), a backup RAM, and an input-output interface (I/F), for example. The microprocessor may perform computing. The ROM may store information such as a program that causes the microprocessor to execute various processes. The RAM may store various pieces of data such as a result of computing. The backup RAM may hold contents of the stored data.

In the example illustrated in FIG. 1, such a vehicle controller 15 may include the determination unit 151, a notifier 152, the traveling controller 153 (a hybrid controller), and a battery controller 154.

In one embodiment of the technology, the vehicle controller 15 may serve as a "vehicle control apparatus".

[E-1. Determination Unit 151]

In a case where an obstacle is present on a road surface on which the vehicle 1 travels, the determination unit 151 may perform a predetermined determination process with regard to the obstacle. Non-limiting examples of such an obstacle may include an object with a lower height than a position of a bumper of the vehicle 1. For example, in the example embodiment, description will be given taking, as an example, a case where such an obstacle is a bump on a road surface.

Figure 2A:
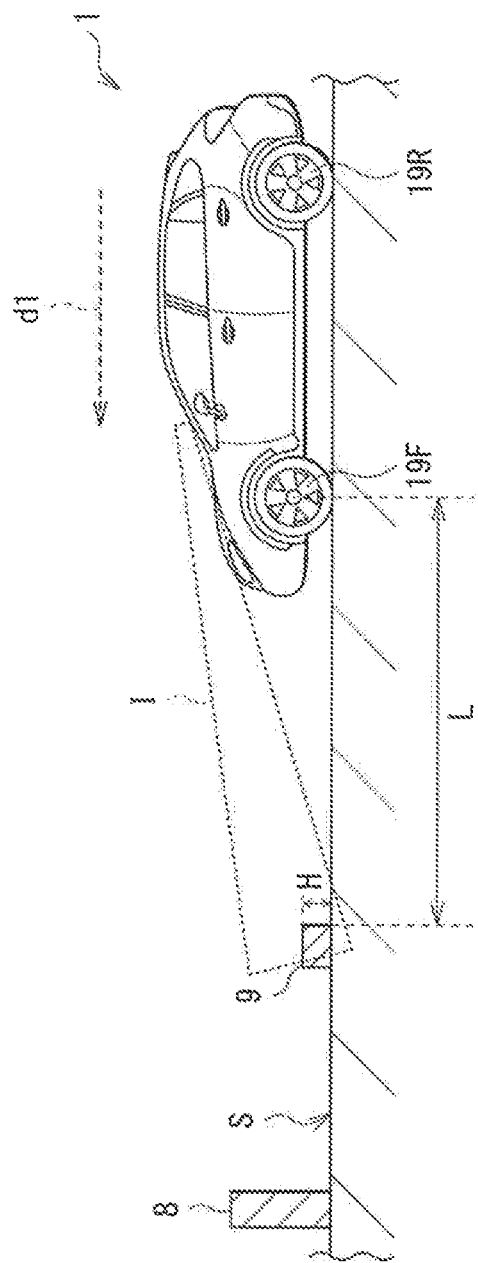
FIGS. 2A and 2B are schematic diagrams illustrating an example of automatic parking during forward traveling according to one example embodiment of the technology.
Figure 2B:
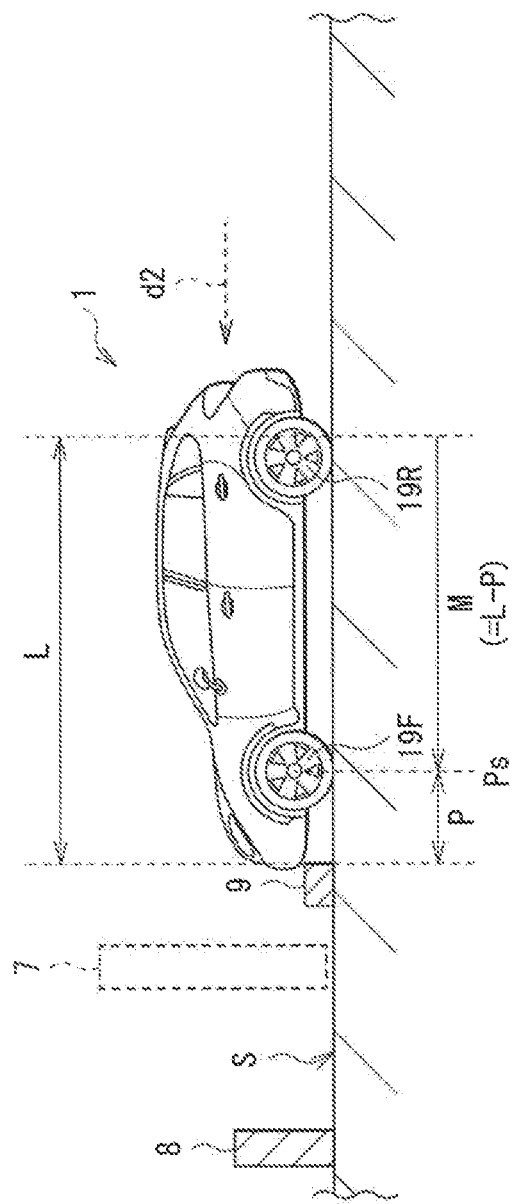

FIGS. 2A and 2B schematically illustrate, as an application example of such a vehicle 1 and such an obstacle (an obstacle 9), an example of a process of controlling the vehicle 1 according to the example embodiment. FIGS. 2A and 2B schematically illustrate an example of automatic parking during forward traveling.

As FIG. 2A, the obstacle 9 (in this example, a bump) may be detected on a road surface S on which the vehicle 1 travels. The vehicle 1 may travel forward (see a traveling direction d1). In this case, the determination unit 151 determines appropriateness, i.e., necessity or reasonability, of the vehicle 1 passing over the obstacle 9. In one example, even in a case where the vehicle 1 is able to pass over the obstacle 9, for example, the determination unit 151 may determine that it is inappropriate to pass over the obstacle 9 if there is no need to pass over the obstacle 9. Such a determination process performed by the determination unit 151 will be described in detail later (e.g., see FIG. 4).

[E-2. Notifier 152]

The notifier 152 may issue various notifications (notices) to the driver of the vehicle 1 by, for example, displaying characters or images and outputting sound. For example, in the example embodiment, the notifier 152 may notify the driver of the vehicle 1 that driving force of the vehicle 1 is controlled (limited) to prevent the vehicle 1 from passing over the above-described obstacle 9. This will be described in detail later.

[E-3. Traveling Controller 153]

The traveling controller 153 may control traveling operation of the vehicle 1, and perform centralized control related to traveling of the vehicle 1. In the example illustrated in FIG. 1, the traveling controller 153 may include an engine controller 153*a* and a motor controller 153*b*.

The engine controller 153*a* may control various operations of the engine 10*a* (see FIG. 1). In other words, the engine controller 153*a* may operate as a so-called "engine control unit (ECU)".

The motor controller 153*b* may control various operations of the motor 10*b* (see FIG. 1). In one example, the motor controller 153*b* may control, for example, operations such as an operation of the motor 10*b* driving wheels of the vehicle 1, and a regenerative operation of the motor 10*b*.

In the example embodiment, in a case where the aforementioned determination unit 151 determines that it is inappropriate to pass over the obstacle 9, the traveling controller 153 controls the driving force of the vehicle 1 to prevent the vehicle 1 from passing over the obstacle 9. In one example, in a case where it is determined to be inappropriate to pass over the obstacle 9, the traveling controller 153 may control the driving force of the vehicle 1 (see a traveling direction d2) to cause the vehicle 1 to stop at a position Ps, as illustrated in FIG. 2B. The position Ps, also referred to as a stopping position, may be a predetermined distance P before the obstacle 9. Such a process of controlling the vehicle 1 by, for example, the traveling controller 153 will be described in detail later (see FIGS. 2A and 2B, and FIGS. 4 to 6).

[E-4. Battery Controller 154]

The battery controller 154 may perform various kinds of control, such as charging control, on the battery 11 (see FIG. 1).

[Operation, Workings, and Effects]

Now, detailed description will be given on operation, workings, and effects of the vehicle 1 of the example embodiment, in comparison with a comparative example.

[A. Comparative Example]

Figure 3A:
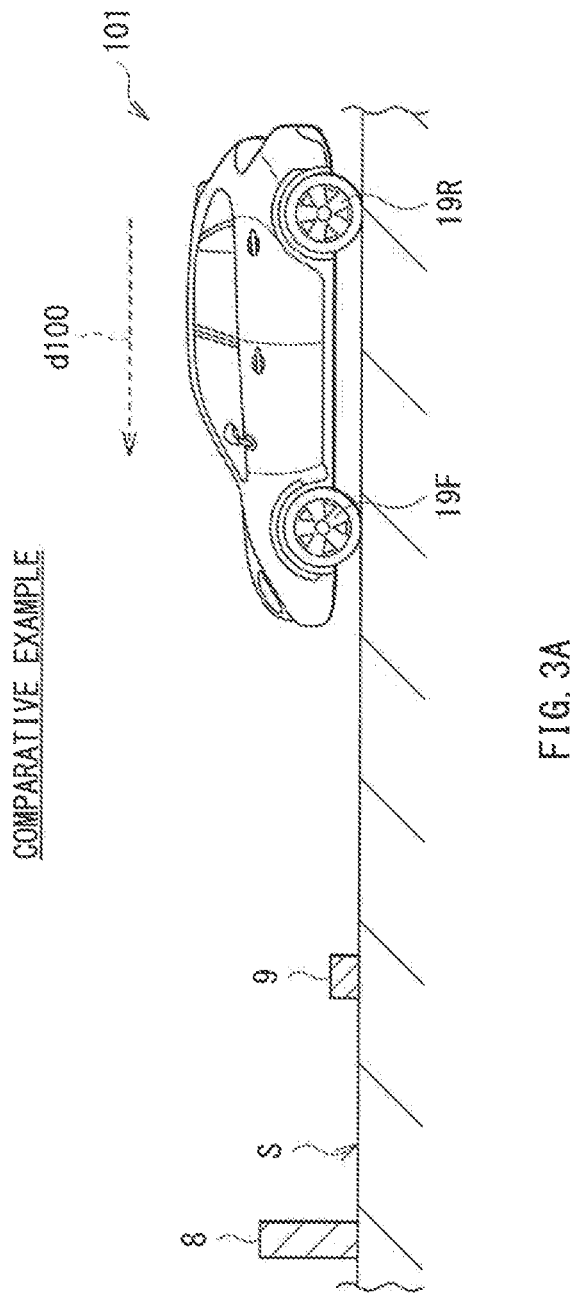
FIGS. 3A-3C are schematic diagrams illustrating an example of automatic parking during forward traveling according to a comparative example.
Figure 3B:
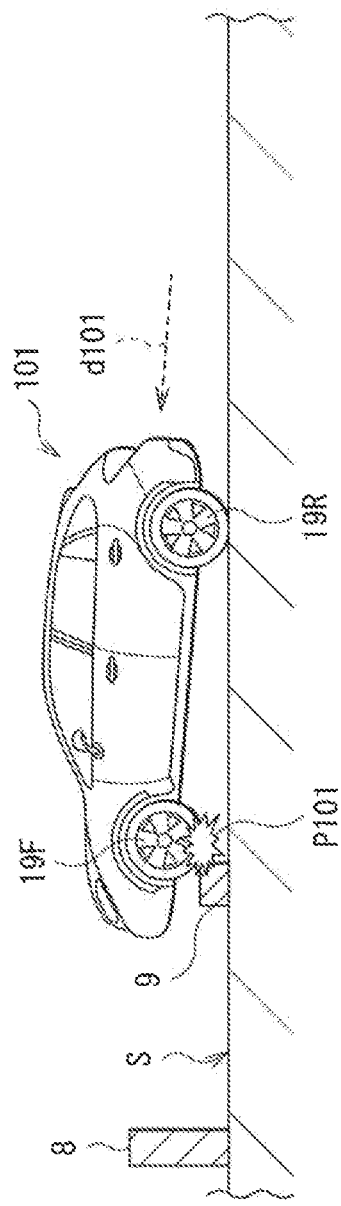
Figure 3C:
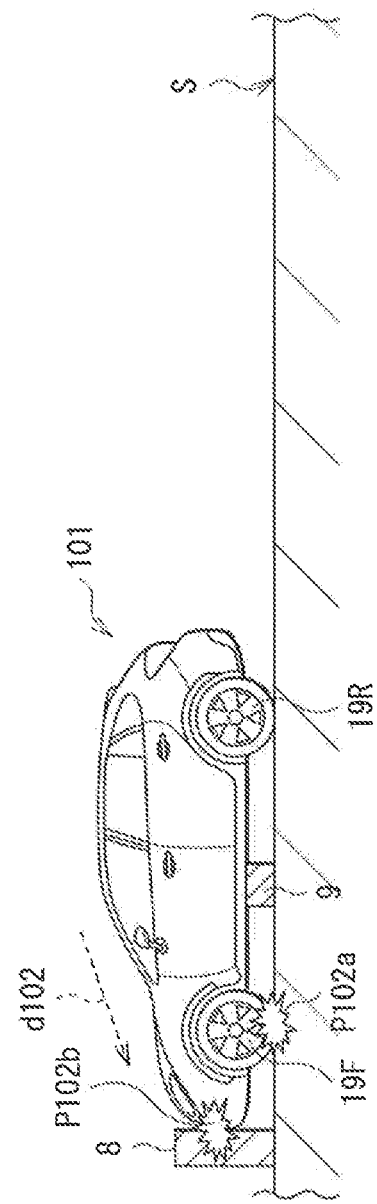

FIGS. 3A-3C schematically illustrate an example of a process of controlling a vehicle 101 according to a comparative example. Like FIGS. 2A and 2B, FIGS. 3A-3C schematically illustrate an example of automatic parking during forward traveling.

First, as illustrated in FIG. 3A, the obstacle 9 (in this example, a bump) is assumed to be present on the road surface S on which the vehicle 101 travels, as in FIG. 2A. The vehicle 101 may travel forward (see a traveling direction d100).

Here, as illustrated in FIG. 3B, the vehicle 101 can pass over the obstacle 9 (see a traveling direction d101) by, for example, a driver of the vehicle 101 operating the accelerator even during automatic parking, without noticing the obstacle 9. In this case, the following issues can occur. As indicated by a reference numeral P101 in FIG. 3B, for example, when a front wheel 19F of the vehicle 101 passes over the obstacle 9, a contact between the front wheel 19F and the obstacle 9 can cause an impact on the vehicle 101 (unintended shock for the driver).

Moreover, as illustrated in FIG. 3C, for example, the driver can further depress the accelerator pedal when the vehicle 101 passes over the obstacle 9. In this case, forcibly passing over the obstacle 9 (see a traveling direction d102) can cause the following issues to occur. As indicated by a reference numeral P102a in FIG. 3C, for example, the front wheel 19F of the vehicle 101 can contact the road surface S at a strong impact. This can result in occurrence of misalignment in the front wheel 19F, i.e., an adverse effect on a vehicle body, or a decrease in steerability of the vehicle 101 (the vehicle 101 can enter an unsteerable state in some cases). Furthermore, in a case where the vehicle 101 thus forcibly passes over the obstacle 9, the vehicle 101 can come into contact with another object positioned beyond the obstacle 9 (in this example, a fence 8) as indicated by a reference numeral P102b in FIG. 3C, for example. In other words, in this case, an impact can occur on the vehicle 101.

Accordingly, in this comparative example, the vehicle 101 passing over the obstacle 9 can cause issues such as occurrence of an impact on the vehicle 101, a decrease in steerability of the vehicle 101, and an adverse effect on the vehicle body of the vehicle 101. This can result in a decrease in traveling stability of the vehicle 101.

[B. Vehicle Control Process of Example Embodiment]

Hence, in the example embodiment, a control process during traveling of the vehicle 1 may be performed by using a method that is described below in detail.

Detailed description will be given on an example of a process of controlling the vehicle 1 (a control process during traveling) of the example embodiment, with reference to FIGS. 4 to 6 in addition to FIGS. 1 and 2.

Figure 4:
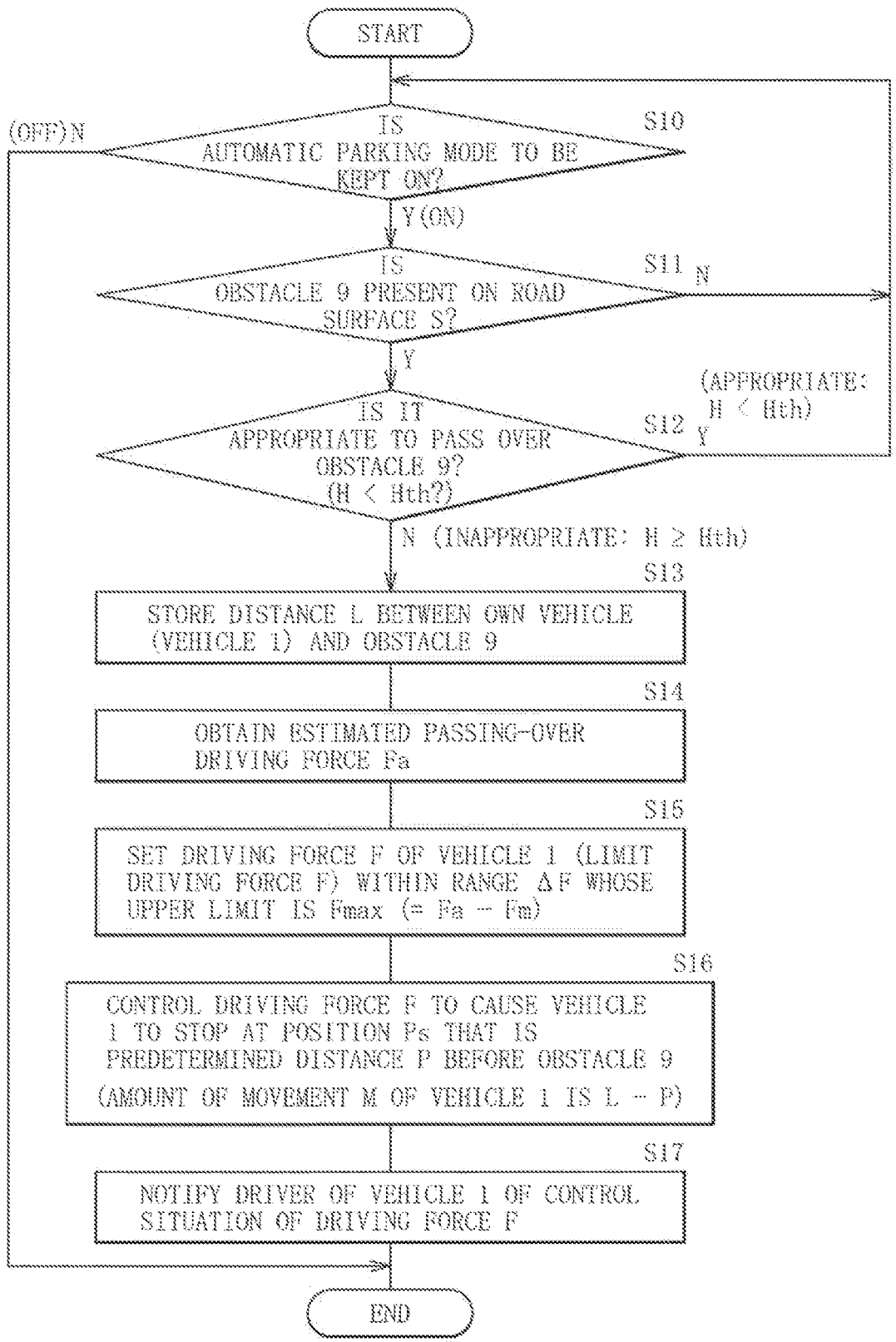
FIG. 4 is a flowchart illustrating an example of a vehicle control process according to one example embodiment of the technology.

FIG. 4 is a flowchart illustrating an example of such a process of controlling the vehicle 1 of the example embodiment. FIG. 4 illustrates an example of the aforementioned automatic parking during forward traveling (see FIGS. 2A and 2B).

In a series of processes illustrated in FIG. 4, first, the vehicle controller 15 (e.g., the traveling controller 153) may determine whether to maintain an ON state of an automatic parking mode (step S10 in FIG. 4). In one example, the vehicle controller 15 may determine whether to maintain the ON state of the automatic parking mode, on the basis of the amounts of depression of the accelerator pedal and the brake pedal detected by the aforementioned accelerator pedal sensor 141 and brake pedal sensor 142.

Here, for example, in a case where the amount of depression of the accelerator pedal, the brake pedal, or both becomes equal to or greater than a predetermined value, the vehicle controller 15 may determine not to maintain the ON state of the automatic parking mode (step S10: N), and set the automatic parking mode to an OFF state. In other words, in this case, a priority may be placed on the intention of the driver of the vehicle 1 to set the automatic parking mode to the OFF state. In this case, the process illustrated in FIG. 4 may end without performing a process of controlling the vehicle 1 described below, i.e., a control process when automatic parking is performed during forward traveling.

For example, in a case where the amounts of depression of the accelerator pedal and the brake pedal each remain less than the predetermined value, the vehicle controller 15 may determine to maintain the ON state of the automatic parking mode (step S10: Y), and maintain the automatic parking mode in the ON state. Thereafter, the determination unit 151 may determine where the obstacle 9 (in this example, a bump) is present on the road surface S on which the vehicle 1 travels, on the basis of information such as a captured image obtained by the aforementioned stereo camera 13 (step S11). The captured image may be captured in an imaging area I illustrated in FIG. 2A.

Here, in a case where such an obstacle 9 is determined to be absent (step S11: N), the process may return to the above-described step S10. In a case where such an obstacle 9 is determined to be present (step S11: Y), the determination unit 151 may thereafter perform determination as follows.

In a case where the obstacle 9 is thus detected on the road surface S, the determination unit 151 determines appropriateness of the vehicle 1 passing over the obstacle 9 (step S12). In one example, the determination unit 151 may determine whether a height H of the obstacle 9 from the road surface S (see FIG. 2A) is less than a predetermined threshold Hth (H<Hth), on the basis of information such as a captured image obtained by the stereo camera 13 as described above.

Note that the above-described threshold Hth may be, for example, a threshold related to an amount of impact on the vehicle 1 in a case where the vehicle 1 is assumed to have passed over the obstacle 9. The threshold may be a value corresponding to a level at which the amount of impact becomes excessively large, for example, about 50 mm.

Here, in a case where such a height H of the obstacle 9 is determined to be less than the threshold Hth (H<Hth) (step S12: Y), the determination unit 151 may determine that it is appropriate for the vehicle 1 to pass over the obstacle 9, and the process may return to the aforementioned step S10.

In a case where such a height H of the obstacle 9 is determined to be equal to or greater than the threshold Hth (H≥Hth) (step S12: N), the determination unit 151 may determine that it is not appropriate (inappropriate) for the vehicle 1 to pass over the obstacle 9, and may go to the following step S13.

In step S13, the traveling controller 153 may acquire a distance L between an own vehicle, i.e., the vehicle 1, and the obstacle 9 (see FIG. 2A), on the basis of information such as a captured image obtained by the stereo camera 13 as described above, and store the distance L. Thereafter, the traveling controller 153 may obtain a driving force F of the vehicle 1 estimated when the vehicle 1 passes over the obstacle 9, i.e., an estimated passing-over driving force Fa, by using a computing method described below, for example (step S14).

Figure 5:
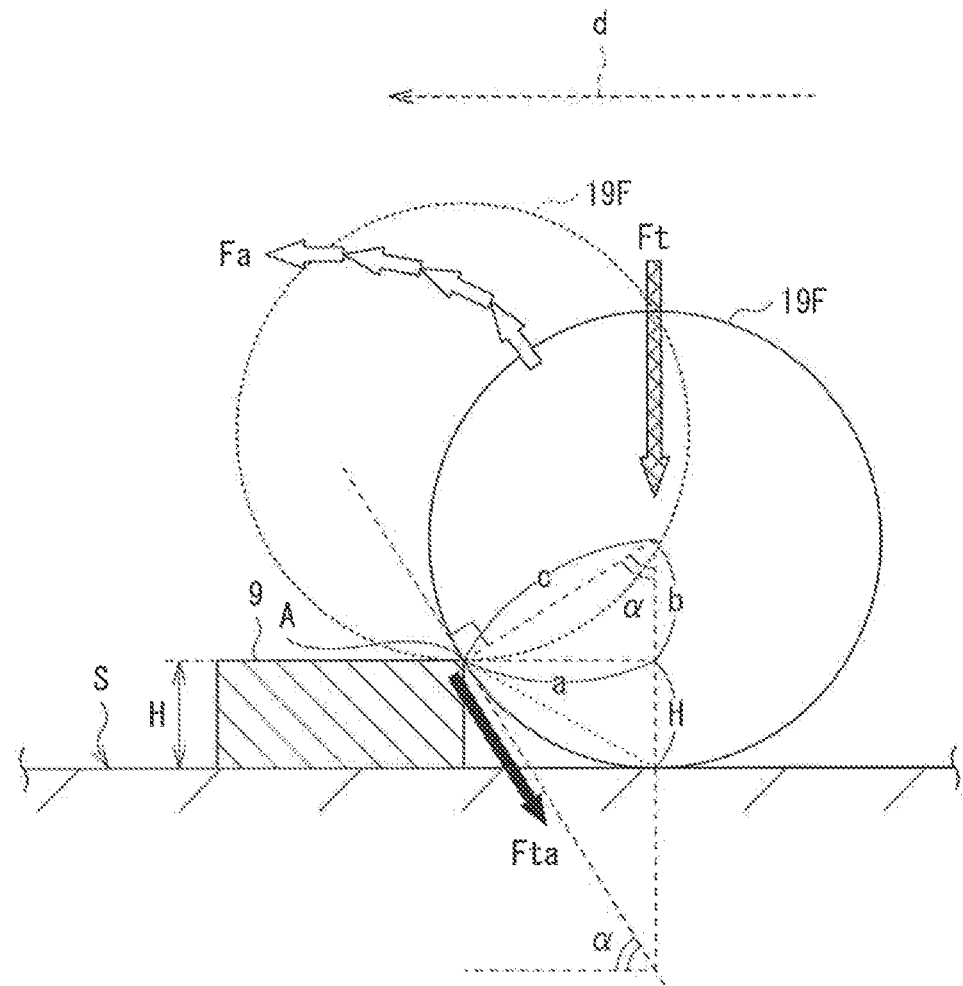
FIG. 5 is a schematic diagram for describing estimated passing-over driving force illustrated in FIG. 4.

FIG. 5 is a schematic diagram for describing such an estimated passing-over driving force Fa. In FIG. 5, the solid line indicates the front wheel 19F that has come into contact with the obstacle 9 (a bump). The dashed line indicates the front wheel 19F that has gone onto the obstacle 9 by the vehicle 1 traveling along a traveling direction d.

Firstly, as illustrated in FIG. 5, an axle load Ft to which a self-weight of the vehicle 1 is partially distributed may act on the front wheel 19F downward in a vertical direction. This axle load Ft may include a force component Fta in a tangential direction (see FIG. 5) at a contact point A of the front wheel 19F and the obstacle 9. The force component Fta may be defined as in the following expression (1). Note that an angle $\alpha$ in this expression (1) may be defined by the following expression (2), according to the cosine theorem.

$$Fta = (Ft \times \sin \alpha) \quad (1)$$

$$\alpha = \cos^{-1}\{(b^2+c^2-a^2)/(2bc)\} \quad (2)$$

Here, lengths "a" and "b" and a radius "c" (a radius of the front wheel 19F) in the above expression (2), the height H of the obstacle 9 illustrated in FIG. 5, and the above-described angle $\alpha$ and force component Fta may have the following relationships (see FIG. 5).

Firstly, the length b may be a value obtained by subtracting the height H from the radius c of the front wheel 19F. The length a may be obtained using the length b and the radius c, according to the Pascal's theorem. In other words, the angle $\alpha$ and the force component Fta may be calculated using the height H and the radius c of the front wheel 19F, which is a known value. Moreover, referring to FIG. 5, cos $\alpha$=(b/c), and b=(c−H) each hold; hence, the following expression (3) holds. Also by using this expression (3), the angle $\alpha$ and the force component Fta may be calculated by using the height H and the radius c of the front wheel 19F, which is a known value, as described above.

$$\alpha = \cos^{-1}\{(c-H)/c\} \quad (3)$$

The force component Fta calculated in this manner may serve as resistance when passing over the obstacle 9. The angle $\alpha$ may gradually decrease as the front wheel 19F goes onto the obstacle 9, and the force component Fta may continuously decrease with the change in angle $\alpha$. Here, (Ft×sin $\alpha$) and traveling resistance R may add up to a sum total of resistance when passing over the obstacle 9. The traveling resistance R may indicate traveling resistance that acts on the whole of the vehicle 1 traveling at a predetermined vehicle speed. For example, the traveling resistance may be rolling resistance, which is independent of vehicle speed. Consequently, outputting the driving force F equal to or greater than the estimated passing-over driving force Fa enables the vehicle 1 to pass over the obstacle 9 (see FIG. 5). The estimated passing-over driving force Fa may be defined by the following expression (4) as such a sum total of (Ft×sin $\alpha$) and the traveling resistance R.

$$Fa = (Ft \times \sin \alpha) + R \quad (4)$$

By using the estimated passing-over driving force Fa obtained in this manner, the traveling controller 153 may thereafter limit the driving force F of the vehicle 1 within a range $\Delta F$, i.e., a driving force range (see FIG. 6 to be described later). An upper limit of the range $\Delta F$ may be a maximum driving force Fmax obtained by the following expression (5). In other words, the traveling controller 153 may set the driving force F within the range $\Delta F$ (step S15). The upper limit of the range $\Delta F$ may be the maximum driving force Fmax that is obtained by subtracting a predetermined limiting value (margin value) Fin from the estimated passing-over driving force Fa. Thus, the driving force F may be controlled to prevent the vehicle 1 from passing over the obstacle 9.

$$F\max = (Fa - Fin) \quad (5)$$

Thereafter, as illustrated in FIG. 2B (see the traveling direction d2), for example, the traveling controller 153 may control (limit) the driving force F to cause the vehicle 1 to stop at the position Ps (step S16). The position Ps, also referred to as the stopping position, may be the predetermined distance P (e.g., about 100 mm) before the obstacle 9. In this manner, the driving force F of the vehicle 1 may be controlled to cause the vehicle 1 to stop at the position Ps before the obstacle 9. Note that such control of the driving force F of the vehicle 1 is as if the vehicle 1 stops in the automatic parking mode toward a virtual wall 7 (an invisible wall) illustrated in FIG. 2B, for example.

Here, an amount of movement M of such a vehicle 1 to the above-described position Ps (see FIG. 2B) may be obtained by the following expression (6), by using the distance L stored in the aforementioned step S13, and the above-described predetermined distance P.

$$M = (L - P) \quad (6)$$

When causing the vehicle 1 to stop at the above-described position Ps in this manner, in one example, the traveling controller 153 may control (limit) the driving force F of the vehicle 1 in the following manner, for example. First, when the vehicle 1 approaches the position Ps (the stopping position), the traveling controller 153 may start to limit the driving force F of the vehicle 1 toward stopping. Note that the traveling controller 153 may determine a position at which to start limiting the driving force F of the vehicle 1, on the basis of the position Ps, the above-described distance L, and the speed of the vehicle 1 (the vehicle speed) detected by the speed sensor 12. Thereafter, the traveling controller 153 may control the driving force F to achieve traveling by the above-described amount of movement M, on the basis of the position Ps, the distance L, and the speed of the vehicle 1 (the vehicle speed) detected by the speed sensor 12.

Figure 6:
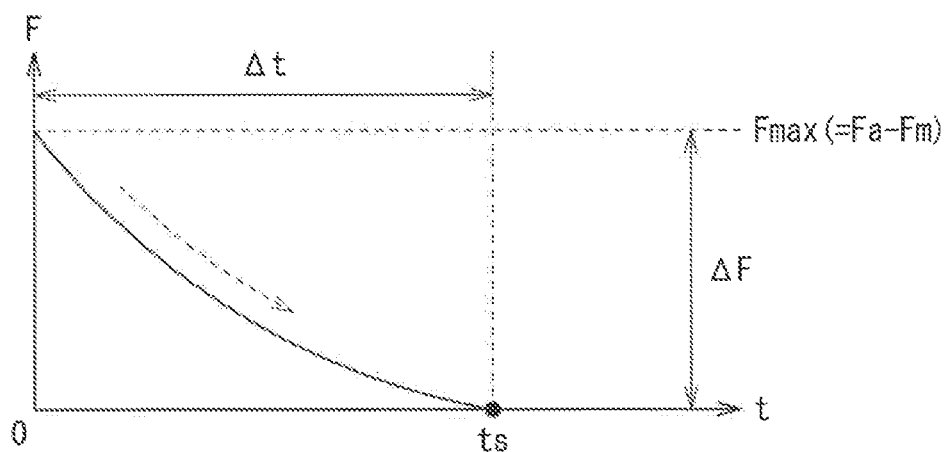
FIG. 6 is a schematic diagram illustrating an example of temporal change during vehicle driving force control illustrated in FIG. 4.

At this occasion, in one example, the driving force F may be controlled (limited) in a manner illustrated in FIG. 6, for example. FIG. 6 schematically illustrates an example of temporal change when the driving force F of the vehicle 1 is controlled. Note that, in FIG. 6, a stopping timing is indicates a timing at which the vehicle 1 stops at the above-described position Ps (the stopping position).

As indicated by the dashed-line arrow in FIG. 6, in one example, the traveling controller 153 may control (limit) the driving force F to cause the driving force F to decrease gradually in a period $\Delta t$ until the vehicle 1 stops at the position Ps, i.e., a stopping period. For example, the driving force F may be caused to decrease not rapidly but in a stepwise manner. For example, the driving force F may be controlled to cause the driving force F to approach zero curvedly (asymptotically) in the example illustrated in FIG. 6.

Thereafter, the notifier 152 may notify the driver of the vehicle 1 that the driving force F of the vehicle 1 is controlled to prevent the vehicle 1 from passing over the obstacle 9, i.e., may notify the driver of a control situation of the driving force F (step S17). In one example, as mentioned above, the notifier 152 may issue such a notification (a notice) by, for example, displaying characters or an image or outputting sound.

This may be the end of the series of processes (the process of controlling the vehicle 1) illustrated in FIG. 4. Note that processes in steps S15 and S16 may be performed in the series of processes illustrated in FIG. 4, but only a process in one of these steps S15 and S16 may be performed, for example.

[C. Workings and Example Effects]

In this manner, in the vehicle 1 of the example embodiment, the determination unit 151 and the traveling controller 153 may respectively perform a determination process related to the obstacle 9 on the road surface S, and a process of controlling the vehicle 1 in the following manner. In a case where the obstacle 9 is detected on the road surface S on which the vehicle 1 travels, the determination unit 151 determines appropriateness of the vehicle 1 passing over the obstacle 9. In a case where it is determined to be inappropriate to pass over the obstacle 9, the traveling controller 153 thereafter controls the driving force F of the vehicle 1 to prevent the vehicle 1 from passing over the obstacle 9.

Thus, in the example embodiment, the aforementioned issues that can occur in a case where the vehicle 1 passes over the obstacle 9 are avoided, unlike in the above comparative example (see FIGS. 3A-3C). The issues may include occurrence of an impact on the vehicle 1, a decrease in steerability of the vehicle 1, and an adverse effect on a vehicle body of the vehicle 1. This makes it possible to improve traveling stability of the vehicle 1 in the example embodiment, as compared with the above comparative example.

Moreover, in the example embodiment, it may be determined to be inappropriate to pass over the obstacle 9 in a case where the height H of the obstacle 9 from the road surface S is equal to or greater than the threshold Hth. This makes it possible to determine, by a simple method, appropriateness of passing over the obstacle 9 described above. This enables traveling stability of the vehicle 1 to be easily improved.

Furthermore, as the above-described threshold Hth, a threshold related to an amount of impact on the vehicle 1 in a case where the vehicle 1 is assumed to have passed over the obstacle 9 may be used. In this case, it is possible to precisely determine appropriateness of passing over the obstacle 9 in consideration of such an amount of impact on the vehicle 1. Thus, it is possible to further improve traveling stability of the vehicle 1.

In addition, in the example embodiment, even in a case where the vehicle 1 is able to pass over the obstacle 9, for example, it may be determined to be inappropriate to pass over the obstacle 9 if there is no need to pass over the obstacle 9. Thus, instead of determining the ability to pass over the obstacle 9, determining appropriateness of passing over the obstacle 9 makes it possible to prevent the vehicle 1 from forcedly (unnecessarily) passing over the obstacle 9. This makes it possible to more reliably avoid the aforementioned issues such as occurrence of an impact on the vehicle 1, a decrease in steerability of the vehicle 1, and an adverse effect on the vehicle body of the vehicle 1, and makes it possible to further improve traveling stability of the vehicle 1.

In the example embodiment, in a case where it is determined to be inappropriate to pass over the obstacle 9, the driving force of the vehicle 1 may be controlled to cause the vehicle 1 to stop at the position Ps (the stopping position) that is the predetermined distance P before the obstacle 9.

Thus, firstly, if the vehicle 1 restarts to pass over the obstacle 9, providing an approach distance before the obstacle 9 increases the ability to pass over the obstacle 9, as compared with a state in which the vehicle 1 is in contact with the obstacle 9 (e.g., a state of being in contact with a bump). Consequently, it is possible to improve the ability to pass over the obstacle 9 when the vehicle 1 restarts, while improving traveling stability of the vehicle 1.

Furthermore, the driving force of the vehicle 1 may be controlled within the range $\Delta F$ whose upper limit is the maximum driving force Fmax. The maximum driving force Fmax may be obtained by subtracting the predetermined limiting value Fin from the estimated passing-over driving force Fa when the vehicle 1 passes over the obstacle 9. Thus, it is possible to reliably prevent the vehicle 1 from passing over the obstacle 9. This makes it possible to further improve traveling stability of the vehicle 1.

In addition, the driving force F may be controlled (limited) to cause the driving force F of the vehicle 1 to gradually decrease in the period $\Delta t$ (the stopping period) until the vehicle 1 stops at the above-described position Ps before the obstacle 9 (see FIG. 6). In this case, for example, it is possible to further improve traveling stability of the vehicle 1, as compared with a case where the driving force of the vehicle 1 is controlled to rapidly decrease.

Moreover, in the example embodiment, the notifier 152 may notify the driver of the vehicle 1 that the driving force F is controlled to prevent the vehicle 1 from passing over the obstacle 9. This enables the driver to understand that the driving force of the vehicle 1 is controlled. Thus, even in a case where, for example, the driver is not aware of the obstacle 9, it is possible to avoid occurrence of awkwardness during traveling of the vehicle 1 (e.g., when the aforementioned automatic parking is performed).

2. MODIFICATION EXAMPLE

Now, a modification example of the foregoing example embodiment will be described. For example, in the foregoing example embodiment, description has been mainly given taking, as an example, the process of controlling the vehicle 1 when automatic parking is performed during forward traveling of the vehicle 1. In contrast, in the following modification example, a process of controlling the vehicle 1 when automatic parking is performed during rearward traveling of the vehicle 1 will be described as an example. Note that, in this modification example, elements that are the same as those in the example embodiment are denoted with the same reference numerals, and description thereof is omitted as appropriate.

[A. Vehicle Control Process of Modification Example]

Figure 7A:
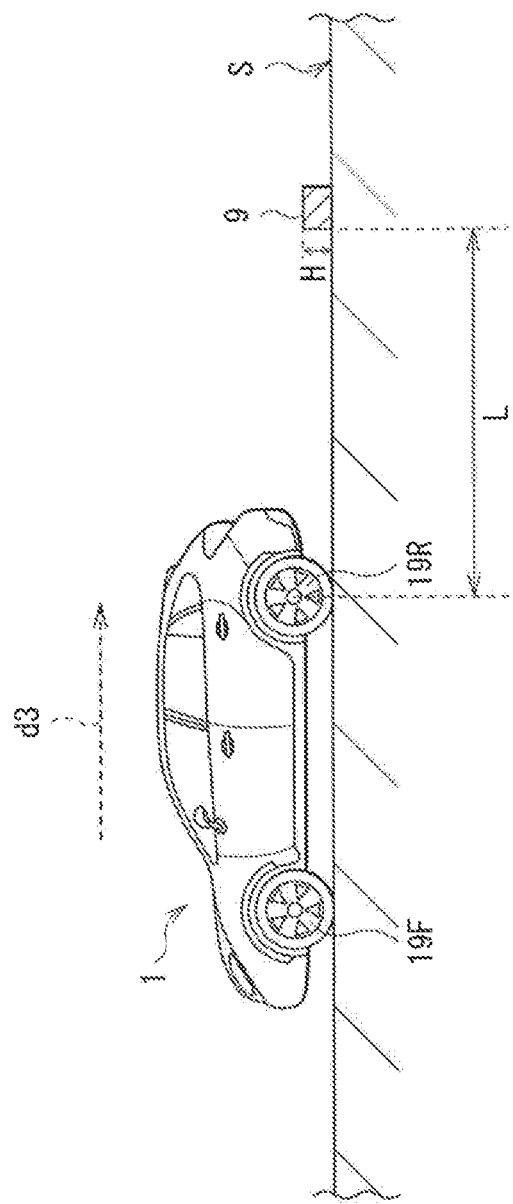

FIGS. 7A and 7b schematically illustrate an example of automatic parking during rearward traveling, as an example of a process of controlling the vehicle 1 according to this modification example.

First, as illustrated FIG. 7A, the obstacle 9 (in this example, a bump) may be detected on the road surface S on which the vehicle 1 travels. The vehicle 1 may travel rearward (see a traveling direction d3). In this case, also in this modification example, the process of controlling the vehicle 1 may be performed basically in a manner similar to that in the foregoing example embodiment (e.g., see FIG. 4). In one example, the vehicle controller 15 may perform processes such as a determination process related to the obstacle 9 and a process of controlling the vehicle 1 in the following manner.

First, the determination unit 151 determines appropriateness of the vehicle 1 passing over the obstacle 9. In one example, even in a case where the vehicle 1 is able to pass over the obstacle 9, for example, the determination unit 151 may determine that it is inappropriate to pass over the obstacle 9 if there is no need to pass over the obstacle 9.

In a case where the determination unit 151 determines that it is inappropriate to pass over the obstacle 9, the traveling controller 153 controls the driving force of the vehicle 1 to prevent the vehicle 1 from passing over the obstacle 9. In one example, in a case where it is determined to be inappropriate to pass over the obstacle 9, the traveling controller 153 may control the driving force F of the vehicle 1 to cause the vehicle 1 to stop at the position Ps, as illustrated in FIG. 7B (see a traveling direction d4 and the amount of movement M). The position Ps, also referred to as the stopping position, may be the predetermined distance P before the obstacle 9.

Note that, at this occasion, the aforementioned estimated passing-over driving force Fa may be obtained by a computing method that is basically similar to the computing method described in the example embodiment (see FIG. 5), except that the front wheel 19F is changed to a rear wheel 19R.

[B. Workings and Example Effects]

In this manner, also in this modification example, it is possible to obtain effects that are basically similar to those of the example embodiment by basically similar workings. In other words, also in this modification example, it is possible to improve traveling stability of the vehicle 1, as compared with the aforementioned comparative example.

3. OTHER MODIFICATION EXAMPLES

Although some example embodiments and modification examples of the technology have been described in the foregoing, the technology is by no means limited to the example embodiments and modification examples described above. Various changes and modifications may be made to any embodiment without departing from the scope of the technology.

For example, the configurations, such as type, shape, arrangement, material, the number of pieces, of the respective members of the vehicle 1 are not limited to those described in the foregoing example embodiment and modification example. An alternative example embodiment may employ type, shape, arrangement, material, the number of pieces, etc., other than those described with reference to the example embodiment and modification example. In addition, values, ranges, magnitude relationships, etc., of the various parameters described in the foregoing example embodiment and modification example are illustrative and non-limiting. An alternative example embodiment may employ other values, ranges, magnitude relationships, etc.

Further, although an example embodiment and a modification example have been described above in which a single motor, i.e., the motor 10b, is provided in the vehicle 1, an alternative example embodiment may include two or more motors. Further, an example embodiment and a modification example have been described above in which the vehicle 1 is the hybrid electric vehicle (HEV). The vehicle 1, however, is not limited to the hybrid electric vehicle. Any embodiment of the technology is applicable to any vehicle, such as an electric vehicle (EV) or a gasoline vehicle.

Moreover, an example embodiment and a modification example have been described above with specific reference to the control processes of the vehicle 1. The control processes of the vehicle 1, however, are not limited to those described above. An alternative example embodiment may perform the control processes or any other process of the vehicle 1 on the basis of any other method. For example, methods such as a method for determining appropriateness of passing over an obstacle and a method for controlling (limiting) driving force of a vehicle when preventing the vehicle from passing over an obstacle are not limited to the methods described in the foregoing example embodiment and modification example.

The series of processes in an example embodiment and a modification example described above may be performed by hardware (circuit) or software (program). In an example embodiment where the processes are performed by the software, the software includes a program group that causes a computer to execute each function. When using each program, each program may be incorporated in the computer in advance, or may be installed in the computer from a network or a computer readable medium.

Furthermore, the various embodiments and examples described above may be applied in any combination. The technology encompasses an embodiment based on such a combination as well.

The example effects described above are merely illustrative and non-limiting. Any embodiment may achieve an effect other than the example effects described above.

The vehicle controller 15 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the vehicle controller 15. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the vehicle controller 15 illustrated in FIG. 1.

It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle control apparatus comprising:
    a traveling controller configured to control a driving force when a vehicle travels; and
    a determination unit configured to determine, in a case where an obstacle is detected on a road surface on which the vehicle travels, whether to allow the vehicle to pass over the obstacle or prevent the vehicle from passing over the obstacle,
    wherein, in a case where the determination unit determines to prevent the vehicle from passing over the obstacle, the traveling controller is configured to limit the driving force of the vehicle to be within a range whose upper limit is a maximum driving force obtained based on a height of the obstacle to prevent the vehicle from passing over the obstacle.

2. The vehicle control apparatus according to claim 1, wherein, in a case where the determination unit determines to prevent the vehicle from passing over the obstacle, the traveling controller controls the driving force to cause the vehicle to stop at a position that is a predetermined distance before the obstacle.

3. The vehicle control apparatus according to claim 1, wherein the maximum driving force for preventing the vehicle from passing over the obstacle is obtained by subtracting a predetermined limiting value from an estimated passing-over driving force that is a driving force estimated when the vehicle passes over the obstacle with the height.

4. The vehicle control apparatus according to claim 2, wherein the maximum driving force for preventing the vehicle from passing over the obstacle is obtained by subtracting a predetermined limiting value from an estimated passing-over driving force that is a driving force estimated when the vehicle passes over the obstacle with the height.

5. The vehicle control apparatus according to claim 1, wherein, even in a case where the vehicle is able to pass over the obstacle, the determination unit determines to prevent the vehicle from passing over the obstacle if there is no need to pass over the obstacle.

6. The vehicle control apparatus according to claim 2, wherein, even in a case where the vehicle is able to pass over the obstacle, the determination unit determines to prevent the vehicle from passing over the obstacle if there is no need to pass over the obstacle.

7. The vehicle control apparatus claim 1, wherein the determination unit determines to prevent the vehicle from passing over the obstacle in a case where the height of the obstacle from the road surface is equal to or greater than a threshold.

8. The vehicle control apparatus claim 2, wherein the determination unit determines to prevent the vehicle from passing over the obstacle in a case where the height of the obstacle from the road surface is equal to or greater than a threshold.

9. The vehicle control apparatus according to claim 7, wherein the threshold comprises a threshold related to an amount of impact on the vehicle in a case where the vehicle is assumed to have passed over the obstacle.

10. The vehicle control apparatus according to claim 8, wherein the threshold comprises a threshold related to an amount of impact on the vehicle in a case where the vehicle is assumed to have passed over the obstacle.

11. The vehicle control apparatus according to claim 1, further comprising a notifier configured to notify a driver of the vehicle that the driving force is controlled to prevent the vehicle from passing over the obstacle.

12. The vehicle control apparatus according to claim 2, further comprising a notifier configured to notify a driver of the vehicle that the driving force is controlled to prevent the vehicle from passing over the obstacle.

13. A vehicle control apparatus comprising circuitry configured to
control driving force when a vehicle travels,
determine, in a case where an obstacle is detected on a road surface on which the vehicle travels, whether to allow vehicle passing over the obstacle or prevent the vehicle from passing over the obstacle, and
control, in a case where the determination unit determines to prevent the vehicle from passing over the obstacle, the driving force of the vehicle to be within a range whose upper limit is a maximum driving force obtained based on a height of the obstacle to prevent the vehicle from passing over the obstacle.

* * * * *